United States Patent
Keller et al.

(10) Patent No.: US 9,903,481 B2
(45) Date of Patent: Feb. 27, 2018

(54) CONTROL VALVE

(71) Applicant: BELIMO HOLDING AG, Hinwil (CH)

(72) Inventors: Urs Keller, Hinwil (CH); Andrew James Jukes, Wetzikon (CH); Giuseppe Cicerchia, Dietikon (CH)

(73) Assignee: BELIMO HOLDING AG, Hinwil (CH)

( * ) Notice: Subject to any disclaimer, the term of this patent is extended or adjusted under 35 U.S.C. 154(b) by 0 days.

(21) Appl. No.: 14/895,558

(22) PCT Filed: May 9, 2014

(86) PCT No.: PCT/EP2014/001248
§ 371 (c)(1),
(2) Date: Dec. 3, 2015

(87) PCT Pub. No.: WO2014/198367
PCT Pub. Date: Dec. 18, 2014

(65) Prior Publication Data
US 2016/0123479 A1 May 5, 2016

(30) Foreign Application Priority Data
Jun. 12, 2013 (CH) ........................ 1103/13

(51) Int. Cl.
F16K 5/12 (2006.01)
F16K 5/06 (2006.01)
F16K 47/02 (2006.01)

(52) U.S. Cl.
CPC ............. *F16K 5/0605* (2013.01); *F16K 5/12* (2013.01); *F16K 47/02* (2013.01)

(58) Field of Classification Search
CPC ........... F16K 5/12; F16K 5/0605; F16K 47/02
(Continued)

(56) References Cited

U.S. PATENT DOCUMENTS 3,403,887 A 10/1968 Myers
3,542,337 A * 11/1970 Scaramucci .......... F16K 5/0605
251/151

(Continued)

FOREIGN PATENT DOCUMENTS

DE   27 32 672 B1   10/1978
DE   199 40 471 A1   3/2001
(Continued)

OTHER PUBLICATIONS

International Search Report of PCT/EP2014/001248 dated Jun. 26, 2014.

*Primary Examiner* — Ian Paquette
(74) *Attorney, Agent, or Firm* — Sughrue Mion, PLLC (57) ABSTRACT

A control valve having a closing element, mounted in a housing between an inlet side and an outlet side and rotatable about an axis between a first and second end positions, and a passage channel through the closing element perpendicularly with respect to the rotational axis. The channel has inlet and outlet openings and connects the inlet side to the outlet side in the first end position, disconnects the inlet side from the outlet side in the second end position, and permits an increasing throughflow of a medium during the transition from the second end position into the first end position with a characteristic curve. Low valve noise is achieved because of the shape, size and configuration of the inlet and outlet openings of the passage channel and the configuration of walls of the passage channel without steps and edges.

6 Claims, 6 Drawing Sheets

(58) Field of Classification Search
USPC .................................. 137/625.32; 251/315.16
See application file for complete search history.

(56) References Cited

U.S. PATENT DOCUMENTS

| | | | |
|---|---|---|---|
| 3,591,129 A | 7/1971 | Hulsey | |
| 4,774,984 A | 10/1988 | Peters | |
| 5,551,467 A | 9/1996 | Booth et al. | |
| 6,021,812 A | 2/2000 | Iwamoto et al. | |
| 6,039,304 A | 3/2000 | Carlson et al. | |
| 6,109,591 A | 8/2000 | Tuttle et al. | |
| 8,166,994 B2 * | 5/2012 | Braga | F16K 5/0605 137/15.22 |
| 2011/0073793 A1 * | 3/2011 | Allen | F16K 5/0605 251/315.16 |
| 2015/0316157 A1 * | 11/2015 | Zikeli | F16K 5/0605 264/328.1 |

FOREIGN PATENT DOCUMENTS

| | | |
|---|---|---|
| EP | 0 309 678 A1 | 4/1989 |
| EP | 1 439 339 A1 | 7/2004 |
| JP | 2010-14280 A | 1/2010 |
| WO | 94/07063 A1 | 3/1994 |
| WO | 01/33120 A1 | 5/2001 |
| WO | 2005/040655 A1 | 5/2005 |
| WO | 2010/117361 A1 | 10/2010 |
| WO | 2012/118452 A1 | 9/2012 |

* cited by examiner

Prior Art

CONTROL VALVE

CROSS REFERENCE TO RELATED APPLICATIONS

This application is a National Stage of International Application No. PCT/EP2014/001248 filed May 9, 2014, claiming priority based on Swiss Patent Application No. 01103/13, filed June 12, 2013, the contents of all of which are incorporated herein by reference in their entirety.

TECHNICAL FIELD

The present invention relates to the field of fluid mechanics. It relates to a control valve for hydraulic and/or pneumatic applications according to the preamble of claim 1.

PRIOR ART

It is known from printed publication U.S. Pat. No. 6,039,304 A, in order to produce a predetermined valve characteristic in ball valves, to insert an additional disc with a specially shaped opening that adapts with a side to the spherical valve body.

It has also already been proposed, however, to use the spherical valve body itself to establish a predetermined valve characteristic.

For instance, it is known from printed publication DE 27 32 672 B1, in order to control and/or regulate the pressure in a ball valve, to insert a control element into the through bore of a cock plug that has the shape of a cylindrical sleeve, one of the ends of which is open whereas the throttle opening is formed in the other end whose cross-sectional shape and size is dependent on the desired throttle characteristics and, accordingly, can be embodied in a wide variety of ways. Printed publication DE 1 99 40 471 A1 discloses a ball valve for installation in a pipeline which comprises a one-part housing with a chamber and with two connection regions arranged on two sides of the chamber for connecting to the fitting pipeline sections, a ball being arranged in the chamber for shutting off and opening the pipeline. The ball has a passage from an inlet opening to an outlet opening, the inlet opening and the outlet opening being embodied with differently designed recesses. This results in a ball valve that reduces the flow as little as possible and has a linear characteristic curve for the throughput in a set angle range that is as large as possible.

Printed publication EP 0 309 678 A1 describes a ball valve with a cock plug having a through bore and a throttle opening arranged at the end of the through bore. A bottom is formed against the cock plug that receives the throttle opening.

A valve ball is known from printed publication EP 1 439 339 A1 whose ball has a passage for the fluid, a throttle opening being embodied at one end of the passage which is cut into the ball through high-pressure jet cutting.

Printed publication U.S. Pat. No. 3,403,887 A discloses a fully rotatable ball valve with a spherical cock plug with a flow passage having a V-shaped end piece in order to enable more precise control particularly upon opening the valve. A similar valve is also shown by printed publication U.S. Pat. No. 5,551,467 A.

In printed publication U.S. Pat. No. 6,021,812 A, a ball valve is described as having a main opening and an auxiliary opening in the cock plug on the inlet side and a sectorial opening on the outlet side. This is intended to accelerate, above all, the beginning of flow upon opening of the valve.

Additional ball valves of this type are known from printed publications U.S. Pat. No. 6,109,591 A and WO 0133120 A1.

A ball valve having only a ball segment as a closing element is also known (WO 2005/040655 A1). In this case, the passage channel is completely omitted, but no improvement is achieved in terms of undesirable noise generation.

These ball valves have the drawback that, when the flow passes through the cock plug, cavitations and noises are generated that are undesirable in certain applications. Various proposals have therefore already been made as to how the noise generation can be reduced or wholly suppressed in ball valves.

Printed publication U.S. Pat. No. 4,774,984 A proposes a low-noise valve in which one side of the cock plug is embodied as a screen with a plurality of small openings that connect the passage through the cock plug to a region lying outside of the cock plug, the screen being brought into a partially blocking position relative to the outlet when the valve is opened. The screen produces counterpressure that suppresses the bursting-open and formation of cavitation bubbles.

Printed publication WO 9407063 A1 shows a low-noise valve in which a first deflector is arranged on the inlet side of the passage through the cock plug. A second deflector is arranged on the front edge of the upper half of the valve. The two deflectors constitute a small flow resistance when the valve is fully opened but do not force the flow into detours when the valve is partially closed. These detours prevent eddy formation, thus reducing noise and vibration.

Printed publication JP 2010014280 A discloses a low-noise valve in which noise and cavitation are reduced in all openings. A through hole and a connecting passage are arranged perpendicular and connected to one another in the cock plug. Moreover, slot-like openings are provided that are arranged at the end of the through holes and serve to reduce noise.

Finally, a ball valve insert is known from printed publication WO 2012/1188452 A1 that is characterized by a special shape of the inlet hole of the liquid medium. The entire geometry of the passage hole of the insert is defined by a certain and specifically established geometry parameters. Logarithmic and linear throughput of the liquid medium through the insert is achieved with specific mutual relationships between the values of the listed geometry parameters of the insert with the direction of rotation of the insert and with the initial position of the opening of the throughput of the liquid medium through the wide or narrower part of the specially shaped inlet hole of the liquid medium. The ball valve insert is intended to solve the problem of linear and logarithmic throughput through the ball valve in a very simple manner. The ball valve insert is also intended to solve the problem of turbulences and vibrations associated therewith and therefore also the problem of the noise of the throughput of the liquid medium through the ball valve. However, there are in fact angular settings and angular setting ranges of the ball and thus of the ball valve insert (see, for example, FIGS. 12 and 19 of the printed publication) in which the flowing medium (at the outlet) flows along an edge, whereby substantial turbulences are again produced that are actually supposed to be prevented.

DESCRIPTION OF THE INVENTION

It is therefore an object of the invention to provide a control valve of the generic type which is characterized in a simple manner by substantially reduced noise generation. This and other objects are achieved by the features of claim 1.

The invention starts from a control valve with a closing element that is supported in a housing between an inlet side and an outlet side so as to be rotatable back and forth about an axis of rotation between a first end position and a second end position and has a passage channel with an inlet opening and an outlet opening running perpendicular to the axis of rotation through the closing element, and that fluidically connects the inlet side to the outlet side in the first end position and fluidically separates the inlet side from the outlet side in the second end position and, and during the transition from the second end position to the first end position enables increasing throughput of a medium with a characteristic curve.

It is characterized in that the characteristic curve is determined by the shape and size of the outlet opening of the passage channel, that the inlet opening is embodied such that, on the inlet side, the free cross section for the medium flowing into the passage channel is independent of the position of the closing element between the two end positions, and that the walls of the passage channel are embodied so as to be free of steps and edges between the inlet opening and the outlet opening of the passage channel. One embodiment of the control valve according to the invention is characterized in that the transition between the first end position and the second end position occurs by means of a rotation of the closing element by 90° about the axis of rotation of the control valve.

Preferably, the inlet side is part of a through bore with an inner diameter running transverse to the axis of rotation of the control valve through the housing, the inlet opening of the passage channel resembling a slotted hole with semicircular ends that is curved with a constant radius of curvature about the axis of rotation and oriented in the radial direction whose height corresponds to the inner diameter of the through bore and that sweeps through an angle of curvature of at least 90°.

Particularly, the outlet side is part of the through bore running through the housing, the outlet opening of the passage channel having an opening surface area that is reduced compared to the cross-sectional surface of the through bore.

Specifically, the opening surface area of the outlet opening comprises a gap-shaped first subregion with a small surface area extending in the direction of rotation and a crescent-shaped second subregion with a large surface area extending symmetrically in the axial direction that are arranged one behind the other in the direction of rotation and continuously merge into one another.

Another embodiment of the control valve according to the invention is characterized in that the closing element is spherical.

Particularly, the closing element is embodied as a single piece.

Preferably, the closing element is sealed toward the inlet side and toward the outlet side, respectively, by a seal against the housing of the control valve.

BRIEF EXPLANATION OF THE FIGURES

The invention will be explained in further detail below with reference to exemplary embodiments in conjunction with the drawings.

FIG. 9 shows a side view of the closing element of FIG. 4 oriented in the direction of flow with the valve closed;

FIGS. 9a, b show different sections of the closing element of FIG. 9 on the sectional planes A-A and B-B;

FIG. 10 shows a side view of the closing element of FIG. 4 oriented in the direction of flow with the valve completely opened;

FIG. 10a shows a section of the closing element of FIG. 10 on the sectional plane C-C;

FIG. 11 shows a side view of the closing element according to FIG. 9, the through bore in the housing being additional indicated by a broken line;

FIGS. 11a-d show different intermediate states during opening of the valve through rotation of the closing element.

MANNERS OF CARRYING OUT THE INVENTION

Figure 1:
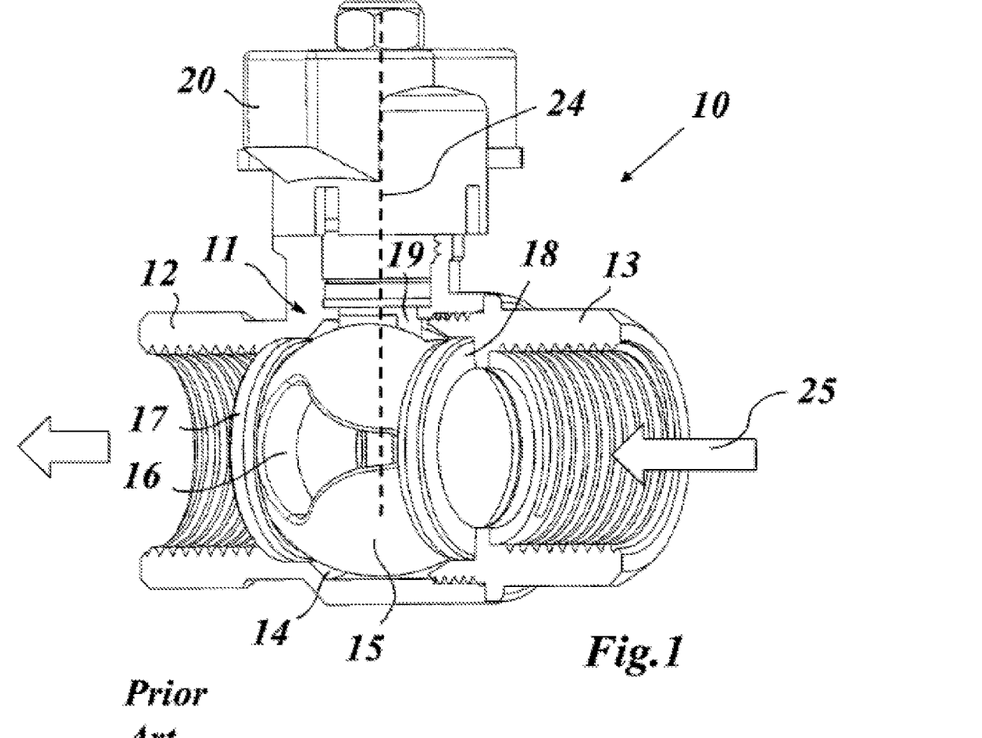
FIG. 1 shows a partial cutaway view of the structure of a control valve according to the prior art as is known from printed publication WO 01/33120 A1.
Figure 2:
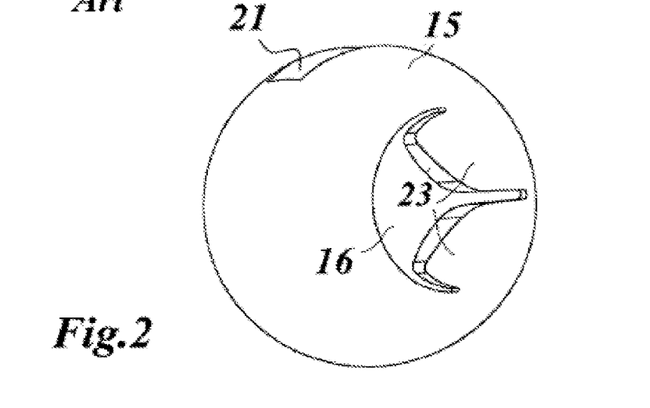
FIG. 2 shows a perspective side view of the spherical closing element of the control valve of FIG. 1 with the specially embodied inlet opening.
Figure 3:
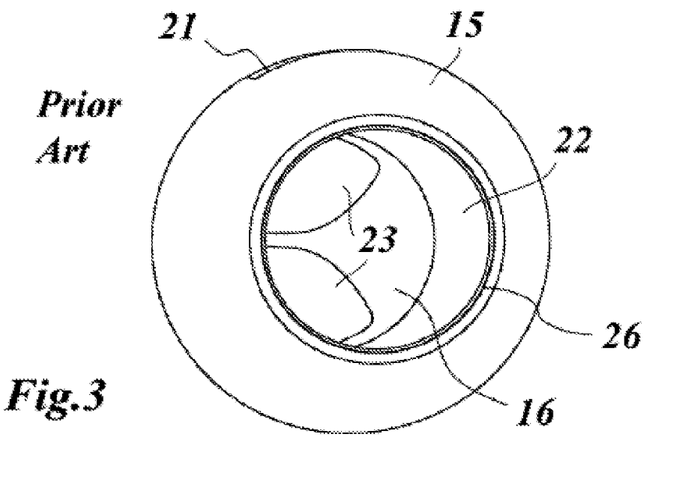
FIG. 3 shows a perspective side view of the spherical closing element of the control valve of FIG. 1 with the circular outlet opening and the cylindrical passage channel.

FIGS. 1-3 show a control valve 10 such as that known from the prior art (printed publication WO 01/33120 A1). The known control valve 10 comprises a housing 11 on which two mutually opposing and flush connection fittings 12 and 13 are embodied. The two connection fittings 12 and 13 equipped with an internal thread define a through bore through the housing 11 that passes through a larger cut-off space 14 arranged in the center. A spherical closing element 15 is pivot-mounted in the cut-off space 14 so as to rotate about an axis of rotation 24 that is oriented perpendicular to the through bore.

The closing element 15 has a passage channel 22 (FIG. 3) having a specially shaped inlet opening 16 on the inlet side (connection fitting 13) and a circular outlet opening 26 on the outlet side (connection fitting 12). A groove 21 is formed in the upper side of the closing element 15 in which an actuating mechanism 20 engages with a commensurately shaped pin 19, and the closing element 15 is sealed against the connection fittings 12 and 13 with a seal 17 and 18, respectively.

The special shape of the inlet opening 16 is determined by two projections 23 lying symmetrically with respect to a center plane. The inlet opening 16 thus has a gap-shaped starting region that is active during opening of the control valve 10 (on the right side in FIG. 2) that expands in the center of the opening into a crescent-shaped end region overhanging on both sides (on the left side in FIG. 2). This shape of the inlet opening results in a specific (equal-percentage) opening characteristic of the valve.

It can be seen in FIGS. 1-3 that the opening cross section in the closing element 15 behind the inlet opening 16 expands suddenly into the circular cross section of the passage channel 22, which unavoidably leads to extreme turbulence behind the edges in the medium flowing through the inlet opening 16 into the passage channel 22 and, as a result, substantial noise. Another source of noise generation occurs because—apart from the completely opened end position of the valve—the outlet opening 26 is not flush with the opening cross section of the passage channel, so that a section of the edge of the outlet opening 26 projects into the flow of the through bore and causes turbulence.

Figure 4:
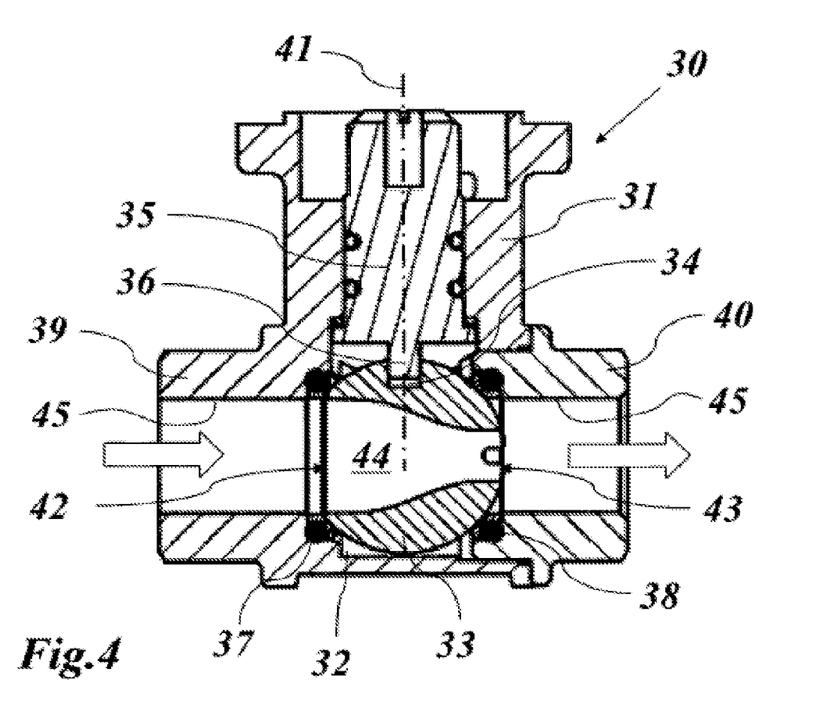
FIG. 4 shows a longitudinal section through a control valve according to an exemplary embodiment of the present invention.
Figure 5:
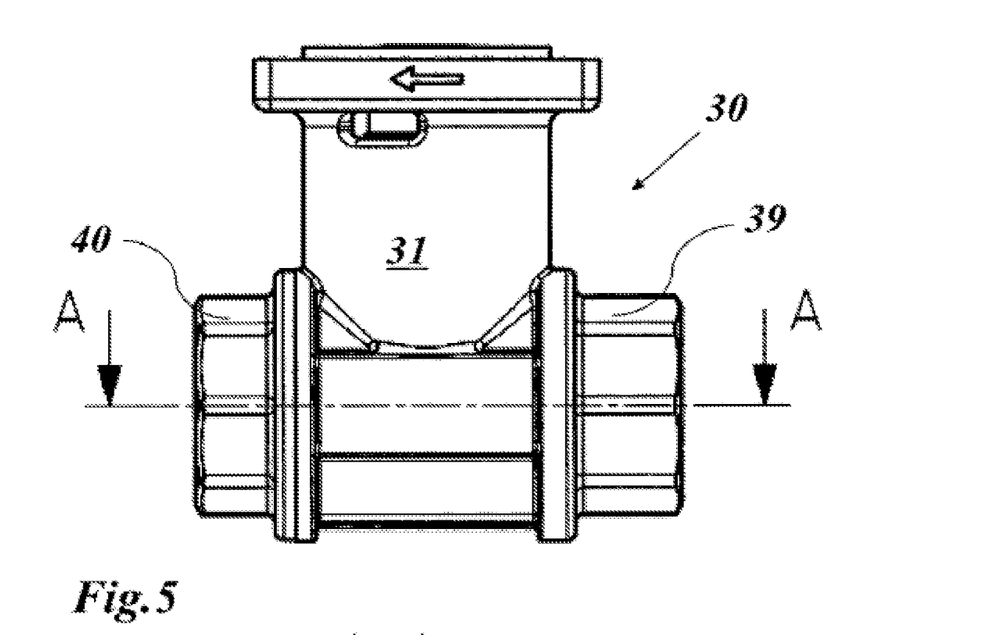
FIG. 5 shows a side view of the control valve of FIG. 4.
Figures 9, 9A, 9B, 10, 10A, 11, 11A, 11B, 11C, 11D:
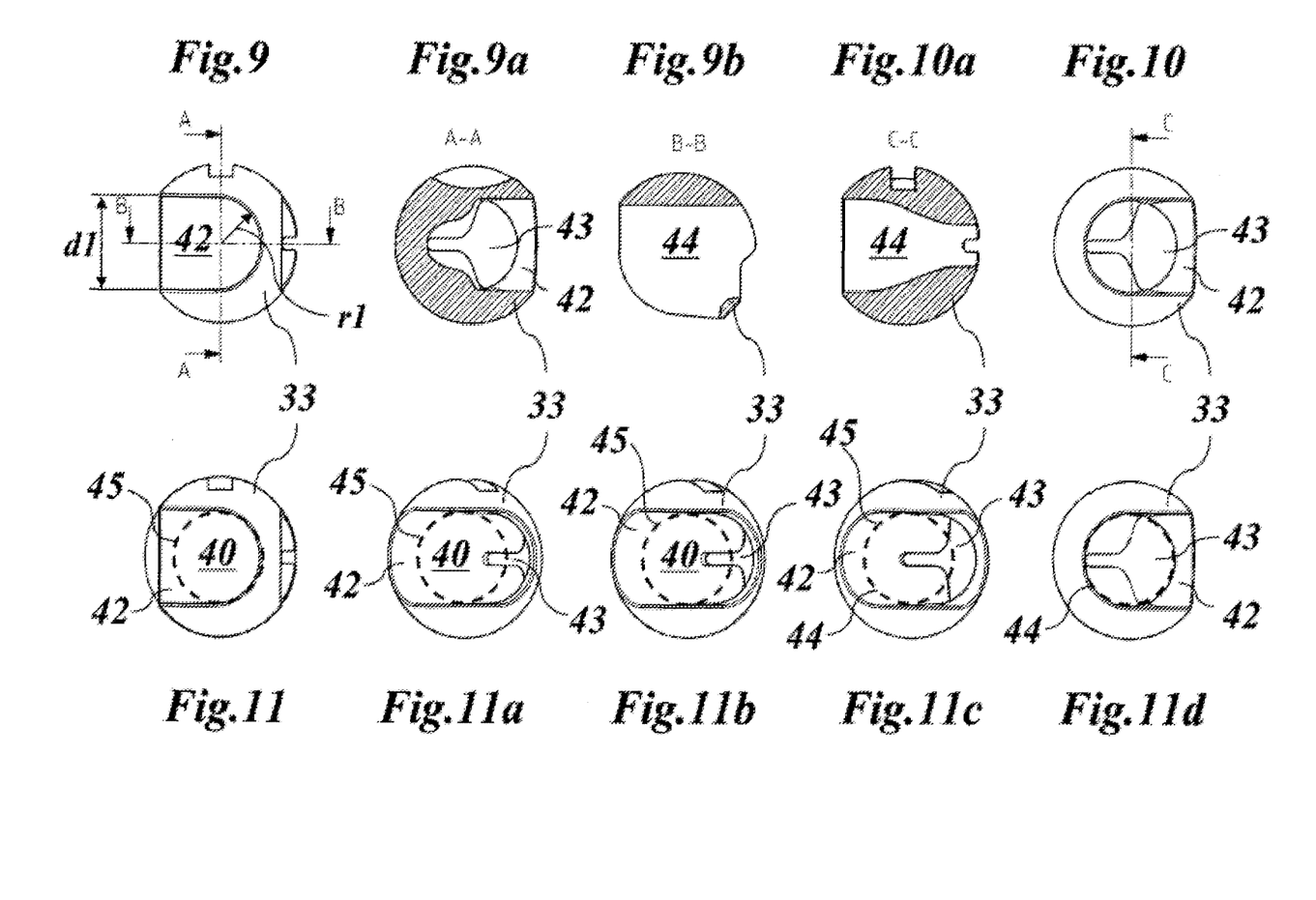

The present invention provides a remedy in this regard through different measures such as those that can be seen in the exemplary embodiment that is illustrated in longitudinal section in FIG. 4. The exemplary control valve 30 of FIGS. 4-8 comprises a housing 31 with an inlet port 39 arranged on the side, an opposing outlet port 40 that is flush with the inlet port, and a cut-off space 32 that is arranged between the two that receives the closing element 33 (which is spherical in this example). The closing element 33 is sealed by means of appropriate annular seals 37 and 38 against inlet and outlet port 39 and 40, respectively. It can rotate about an axis of rotation 41 that is oriented perpendicular to the through bore 45 defined by the ports 39, 40 (FIG. 11). The closing element 33 is actuated (rotated) by means of a rotatable actuating element 35 that engages with a pin 36 in a groove 34 on the upper side of the closing element 33.

Figure 6:
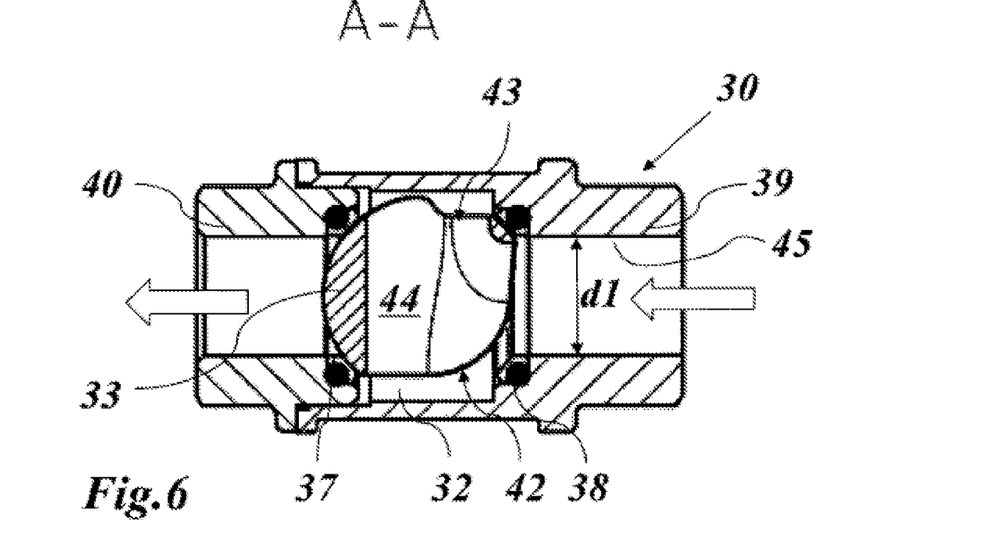
FIG. 6 shows a sectional view through the control valve of FIG. 5 on the sectional plane A-A with the valve closed.
Figure 12:
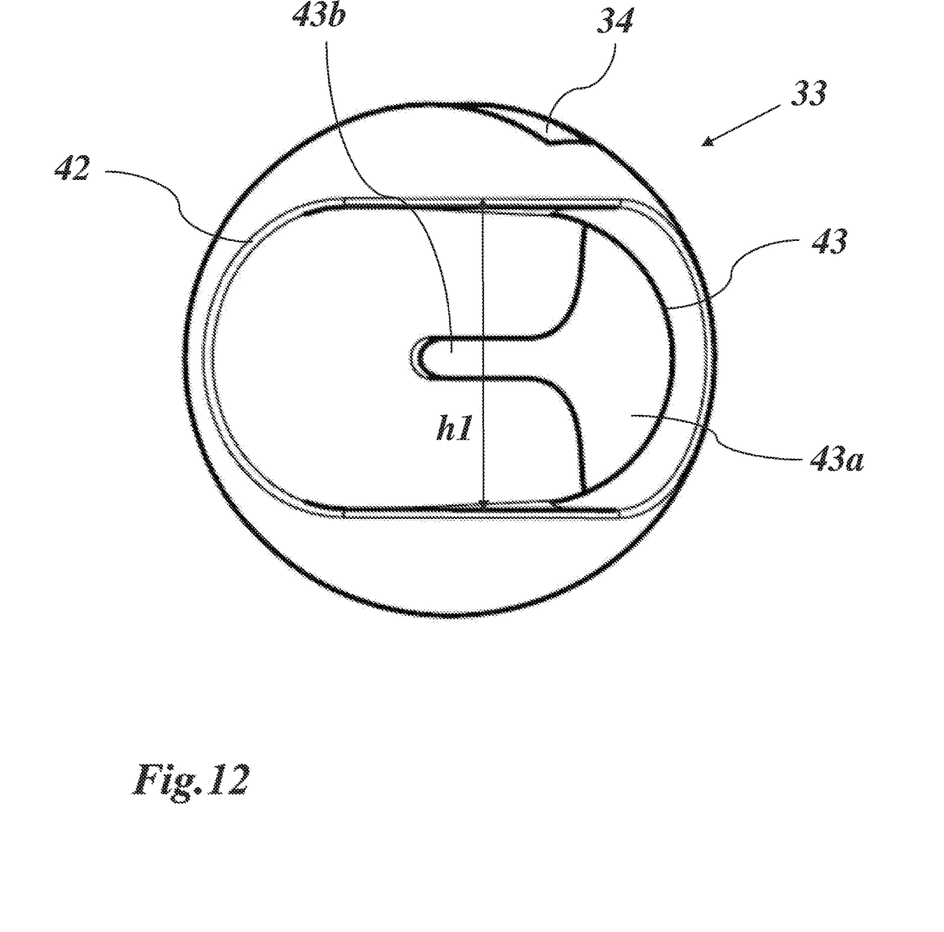
FIG. 12 shows a three-dimensional representation of the closing element that corresponds approximately to the position depicted in FIG. 11c.

As can best be seen from FIG. 12, the spherical closing element 33 has a passage channel 44 that goes through the ball and leads at its ends with an inlet opening 42 and an outlet opening 43 to the environment. Unlike in the valve of FIG. 1, the throughput characteristics of the ball valve are determined substantially by the size and edge contour of the outlet opening 43, which is substantially smaller than the inlet opening 42. In order to achieve an equal-percentage characteristic in the starting region as well (FIGS. 11 a-c), the inlet opening 43 also has a gap region 43b and a crescent region 43a that merge into each other in the center of the opening. The inlet opening 42 is adapted in terms of its dimensions to the through bore 45 defined by the ports 39 and 40. For this purpose, the inlet opening 42 has the shape of a slotted hole that is bent about the axis of rotation 41 and has a constant height h1 (FIG. 12) and is delimited at the ends by a respective semicircle with the radius r1 (FIG. 9). As can be seen in FIG. 4, the height h1 is equal to the inner diameter d1 of the through bore (FIG. 6). In the depicted exemplary embodiment, the control valve 30 has two end positions, which can be seen in FIGS. 4 and 8 and in FIG. 6. In the end position shown in FIG. 6, the control valve 30 is closed off; no throughput is possible through the through bore 45. In the other end position shown in FIGS. 4 and 8, the control valve 30 is completely open; throughput is at the maximum and is determined by the outlet opening 43.

Figure 7:
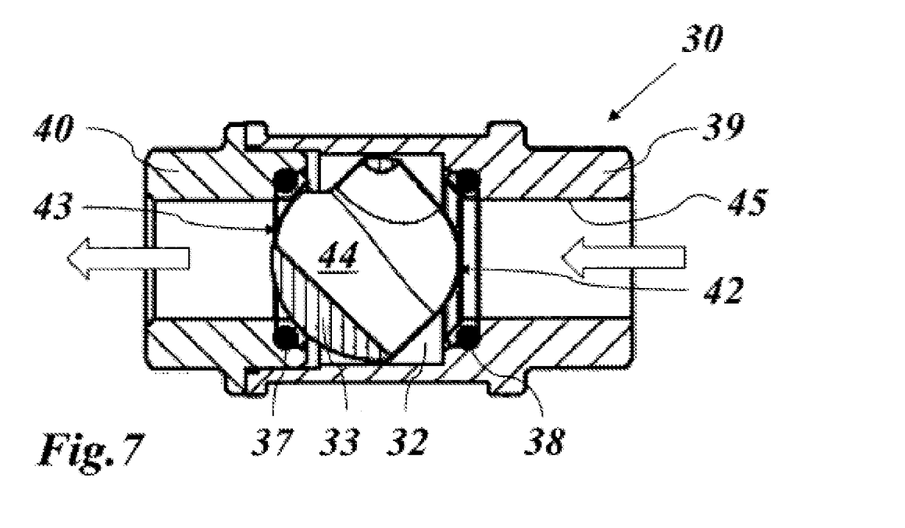
FIG. 7 shows a sectional view comparable to that of FIG. 6 with the valve half opened (45° rotation)
Figure 8:
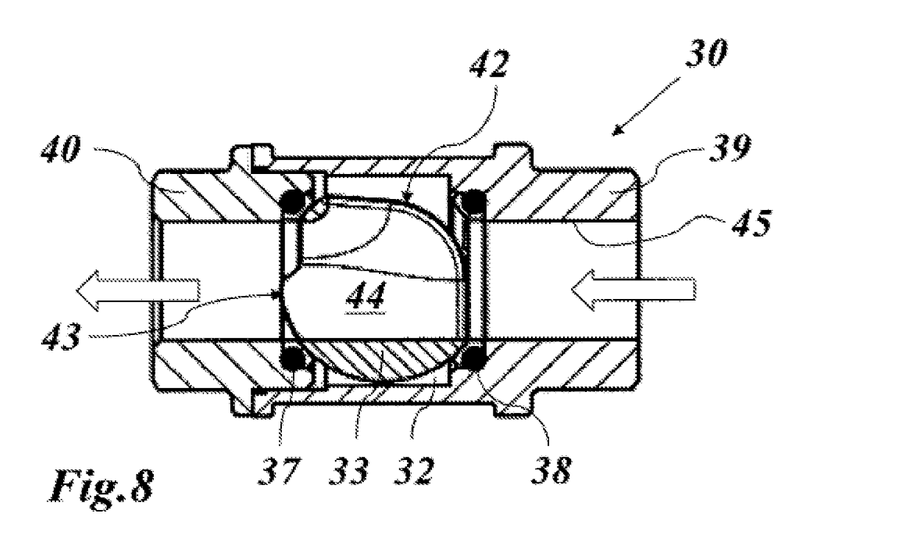
FIG. 8 shows a sectional view comparable to that of FIG. 6 with the valve completely opened (90° rotation)

The transition between the two end positions occurs by means of a rotation of the closing element 33 about the axis of rotation 41 by 90°. An intermediate position (rotation by 45°) is illustrated in FIG. 7. The inlet opening 42 is now embodied precisely such and the length of the slotted hole selected such that semicircle of the slotted hole delimiting the end side coincides with the edge of the through bore in the inlet port 39 in both end positions (see FIGS. 11 and 11 d). In this way, it is ensured that, over the entire pivot range of 90°, the closing element 33 does not project in a disruptive manner with an edge into the through bore and cause turbulence.

Rather, a largely continuous transition is obtained between inlet port 39 and closing element 33 that influences the flowing medium only slightly.

Besides the formation of the outlet opening 43 as the opening that determines the throughput characteristics of the control valve 30 and the formation of the inlet opening 42 as a curved slotted hole that does not engage in the flow in the pivot range of the valve, another feature contributes to minimizing noise generation: The walls of the passage channel 44 between the inlet opening 42 and the outlet opening 43 of the passage channel 44 are free of steps and edges. The inlet opening 42 tapers continuously toward the outlet opening 43, whereby abrupt changes in diameter, increments and bends or edges that contribute to the formation of turbulence are avoided. This uniform cross-sectional change over the course of the passage channel can be seen especially clearly in FIG. 12.

The spherical closing element 33 is embodied as a single piece in the example. Depending on the medium flowing through the valve, it can be made of a metal, a ceramic or even a plastic. Instead of the spherical closing element, however, a cylindrical closing element can also be provided that is rotated about the cylinder axis. Similarly, it is conceivable to design the opening, which determines the characteristics of the valve, differently in order to produce different throughput characteristics.

LIST OF REFERENCE SYMBOLS 10 control valve
11 housing
12, 13 connection fitting
14 cut-off space
15 closing element (ball)
16 inlet opening
17, 18 seal
19 pin
20 actuating mechanism
21 groove
22 passage channel
23 projection
24 axis of rotation
25 medium
26 outlet opening
30 control valve (ball valve)
31 housing
32 cut-off space
33 closing element (ball)
34 groove
35 actuating element
36 pin
37, 38 seal
39 inlet port
40 outlet port
41 axis of rotation
42 inlet opening (passage channel)
43 outlet opening (passage channel)
43a crescent region
43b gap region
44 passage channel
45 through bore

The invention claimed is:
1. A control valve comprising:
a housing;

a closing element that is pivot-mounted in the housing between an inlet side and an outlet side so as to rotate about an axis of rotation back and forth between a first end position and a second end position and has a passage channel with an inlet opening and an outlet opening running perpendicular to the axis of rotation through the closing element, wherein said closing element fluidically connects the inlet side to the outlet side in the first end position and fluidically separates the inlet side from the outlet side in the second end position and, during the transition from the second end position to the first end position, allows increasing throughput of a medium with a characteristic curve, wherein the characteristic curve is determined by the shape and size of the outlet opening of the passage channel, wherein the inlet opening is embodied such that, on the inlet side, the free cross section for the medium flowing into the passage channel is independent of the position of the closing element between the two end positions, wherein the walls of the passage channel between the inlet opening and the outlet opening of the passage channel are embodied so as to be free of steps and edges, wherein the transition between the first end position and the second end position occurs by means of a rotation of the closing element by 90° about the axis of rotation of the control valve, and wherein the inlet side is part of a through bore with an inner diameter ($d1$) running transverse to the axis of rotation of the control valve through the housing, and that the inlet opening of the passage channel is a slotted hole with semicircular ends that is curved with a constant radius of curvature about the axis of rotation and oriented in the radial direction whose height ($d1$) corresponds to the inner diameter ($d1$) equals of the through bore and that sweeps through an angle of curvature of at least 90°.

2. The control valve as set forth in claim 1, characterized in that the outlet side is part of the through bore running through the housing, and that the outlet opening of the passage channel has an opening surface area that is reduced compared to the cross-sectional surface of the through bore.

3. The control valve as set forth in claim 2, characterized in that the opening surface area of the outlet opening comprises a gap-shaped first subregion with a small surface area extending in the direction of rotation and a crescent-shaped second subregion with a large surface area extending symmetrically in the axial direction that are arranged one behind the other in the direction of rotation and continuously merge into one another.

4. The control valve as set forth in claim 1, characterized in that the closing element is spherical.

5. The control valve as set forth in claim 4, characterized in that the closing element is embodied in a single piece.

6. The control valve as set forth in claim 4, characterized in that the closing element is sealed toward the inlet side and toward the outlet side, respectively, by a seal against the housing of the control valve.

* * * * *